Nov. 13, 1951 — P. E. BESSIERE — 2,575,000
COOLING DEVICE FOR ELECTRICAL APPARATUS
IN PARTICULAR ELECTRIC BRAKES
Filed May 29, 1948

INVENTOR
Pierre Etienne Bessiere
BY Lucke & Lucke
ATTORNEY

Nov. 13, 1951        P. E. BESSIERE        2,575,000
COOLING DEVICE FOR ELECTRICAL APPARATUS
IN PARTICULAR ELECTRIC BRAKES
Filed May 29, 1948                3 Sheets-Sheet 2

INVENTOR
Pierre Etienne Bessiere
BY
Lucke & Lucke
ATTORNEY

Nov. 13, 1951 P. E. BESSIERE 2,575,000
COOLING DEVICE FOR ELECTRICAL APPARATUS
IN PARTICULAR ELECTRIC BRAKES
Filed May 29, 1948 3 Sheets-Sheet 3

INVENTOR
Pierre Etienne Bessiere
BY
Lucke & Lucke
ATTORNEY

Patented Nov. 13, 1951

2,575,000

UNITED STATES PATENT OFFICE 2,575,000

COOLING DEVICE FOR ELECTRICAL APPARATUS IN PARTICULAR ELECTRIC BRAKES

Pierre Etienne Bessière, Paris, France, assignor to Societe Electro-Mecanique de L'Aveyron S. A., Rodez, France, a society of France Application May 29, 1948, Serial No. 30,026
In France October 23, 1947

14 Claims. (Cl. 172—285)

The present invention relates to cooling devices for electrical apparatus and in particular electric brakes, that is to say brakes in which a rotor, preferably made of a magnetic metal and rigid with a shaft to be braked, revolves in the magnetic field produced by electro-magnets when the latter are energized by an electric current, braking being due to the Foucault currents that are thus created in this rotor.

In the course of braking, a considerable amount of heat, due to Joule's effect, accumulates in said rotor, which heat should be rapidly dissipated into the surrounding air, so that neither the rotor, nor the bearings of its shaft, nor the electro-magnets, in particular the windings thereof, can be brought to a temperature incompatible with their good operation. This is why electric brakes or analogous devices are fitted with powerful cooling means.

The object of the present invention is to provide a cooling device for apparatus of this kind which is better adapted to meet the requirements of practice than those used up to now.

Preferred embodiments of my invention will be hereinafter described with reference to the accompanying drawings, given merely by way of example and in which.

Figure 7:
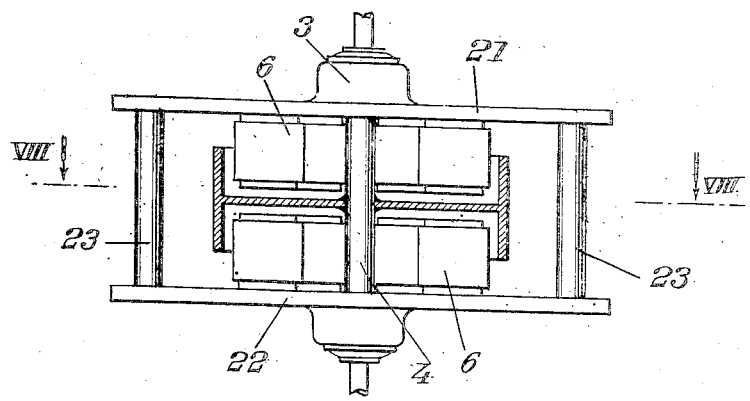
Figure 8:
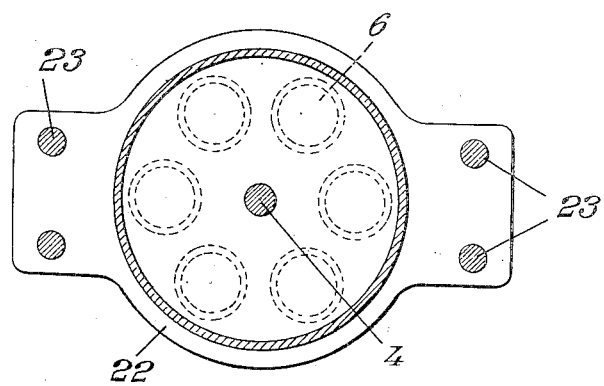
Figure 9:
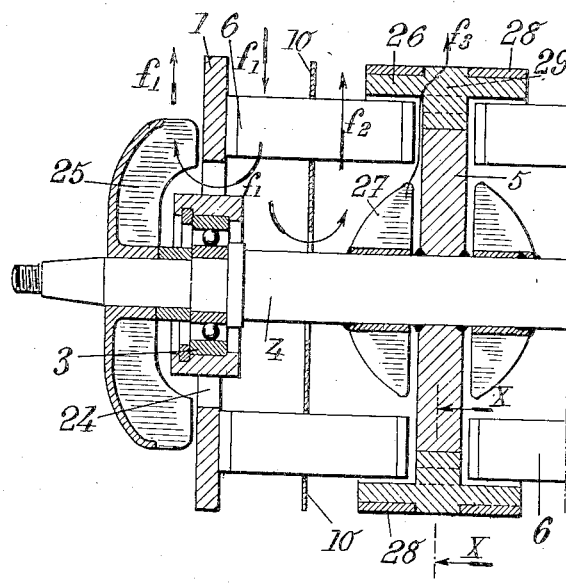
Figure 10:
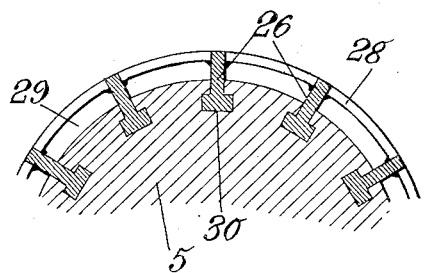

Fig. 7 diagrammatically shows another modification of an electric brake according to the invention;

Fig. 8 shows, in part section, on the line VIII—VIII of Fig. 7, the frame of a brake without the rotor and the electro-magnets;

Fig. 9 shows, partly in section, still another embodiment of a brake according to the invention;

Fig. 10 is a section through the peripheral portion of the rotor, on the line X—X of Fig. 9.

Figure 1:
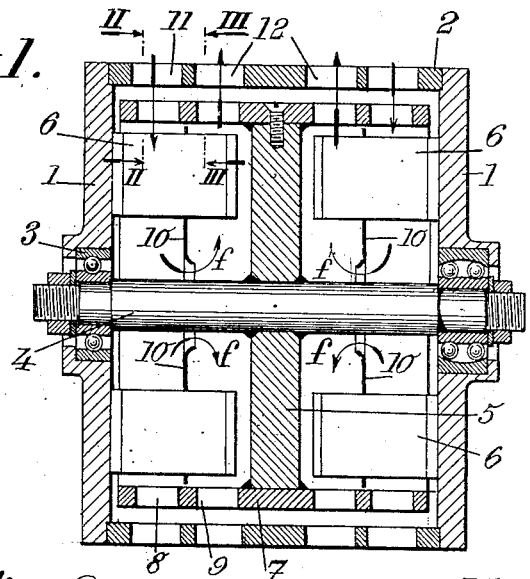
Fig. 1 shows, in diagrammatic axial section, an electric brake provided with cooling means according to my invention.

The brake shown by Fig. 1 of the drawings includes a frame constituted by two side plates 1 connected together by a cylindrical wall 2 provided with apertures.

These two side plates carry ball bearings 3 for the ends of a shaft 4 on which is mounted a rotor 5 of a magnetic metal, for instance soft steel, this rotor being preferably disc-shaped. Furthermore, side plates 1 carry on either side of rotor 5, a plurality of electro-magnets 6 adapted to create, when energized by an electric current Foucault currents inside rotor 5 and thus to exert a braking action upon said rotor.

It is clear that the Foucault currents created in rotor 5 produce an intensive heating of the rotor and that it is necessary to dissipate this heat into the surrounding air to avoid detrimental heating of the whole brake, in particular of the rotor itself, of the electro-magnets and of ball bearings 3 to which heat might be transmitted through shaft 4.

In order to facilitate dissipation of heat into the surrounding atmosphere, I provide, according to the present invention, rotor 5, at its periphery, with a metallic rim 7 having a width substantially greater than that of rotor 5 proper.

I may constitute this rim of the same metal as that which constitutes rotor 5 or of another metal, preferably one having a thermal conductivity higher than that of the metal which constitutes rotor 5 proper, such as aluminum copper, etc. Rim 7 may be fixed on the rotor in any suitable manner, for instance by shrinking on and/or welding, by means of screws (see Fig. 1) of by molding of the rim, in particular when the latter is of aluminum, on disc 5 (see Fig. 5).

The cooling action of this rim is as follows: heat flows preferably toward the periphery of the rotor by conduction, and is evacuated relatively quickly to the outside owing to the large area of rim 7, and this partly by contact of this surface with the surrounding air and partly by radiation. In this way, the amount of heat which reaches bearings 3 by conduction through the center of rotor 5 and shaft 4 is considerably reduced.

According to another feature of my invention, I divide by means of a partition 10 each of the spaces located between rotor 5 and the side plates of the brake frame into two chambers one of which includes the outer ends and the other the inner ends of electro-magnets 6, these chambers communicating together in the vicinity of shaft 4, and I create, through these chambers, U-shaped air streams (see the arrows on Fig. 1) passing radially and in opposed directions through these two respective chambers, the 180° change of direction (see arrows *f*) taking place in the vicinity of shaft 4. The air streams thus created, when they follow the path indicated by the arrows in Fig. 1, first cool the outer portions of the electro-magnets, then the portions of shaft 4 on either side of rotor 5 and finally the inner ends of the electro-magnets, together with rotor 5 itself.

Figure 2:
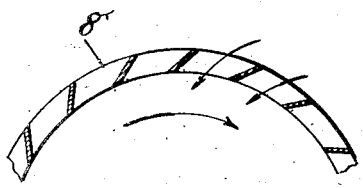
Figs. 2 and 3 are sections on the lines II—II and III—III of Fig. 1.
Figure 3:
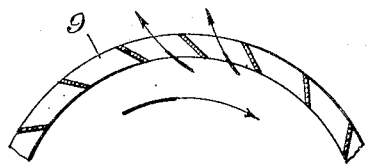

Obviously, the means for producing such air streams may be of many kinds. However, according to an embodiment of my invention which seems to be particularly advantageous, the rim 7 of the rotor which passes around electro-magnets 6 is arranged to constitute a fan causing air to flow into the outer chambers, adjacent to side plates 1, and evacuating this air, after its direction has been reversed, from the inner chambers, adjacent to rotor 5. Thus I provide, in each of the portions of rim 7 that extend on either side of rotor 5 proper, two series of apertures 8 and 9, the partitions between consecutive apertures 8 being so shaped as to constitute blades which drive air into the brake for the direction of rotation of the rotor indicated by Fig. 2, whereas the partitions between apertures 9 are shaped to form blades drawing air from the inside of the brake to discharge it to the outside, for the same direction of rotation of the rotor.

In order to permit inflow of these air streams into the brake frame and outflow of this air from said frame, I further provide, in the external cylindrical wall of this frame, apertures 11 and 12 located respectively opposite the series of apertures 8 and 9 provided in the rotor rim.

I thus obtain a very intensive cooling of all the portions of the brake that require it. The fan action of rim 7 is particularly important, in view of the fact that this rim is located at the periphery of the rotor and consequently moves with a high circumferential velocity for a given angular velocity.

Figure 4:
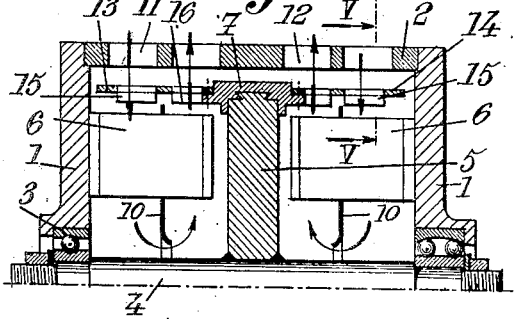
Fig. 4 shows a modification of the brake shown by Fig. 1, according to the invention.
Figure 5:
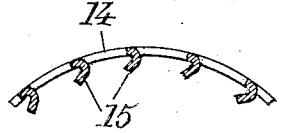
Fig. 5 is a section on the line V—V of Fig. 4.

In the modification shown by Figs. 4 and 5, rim 7 carries, on either side thereof, cylindrical extensions 13 and 14 which constitute a portion of the fan and are provided with blades 15 intended to blow air into the brake, whereas blades 16, which serve to draw air from the inside of the frame, are rigid with rim 7.

Figure 6:
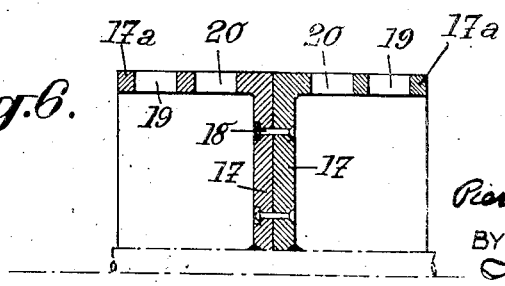
Fig. 6 shows, in section, the rotor of an electric brake made according to another embodiment of the invention.

According to the modification shown by Fig. 6, the rim provided at the periphery of the rotor is not fixed thereon but integral therewith.

According to a particularly advantageous embodiment, the rotor is constituted by two cup-shaped drop forgings 17 connected together for instance by means of rivets 18, bolts or the like, the two adjoining end portions of these cup-shaped pieces 17 constituting the rotor proper, whereas the cylindrical portions 17a of these pieces surround the electro-magnets, carrying blades 19 and 20, and forming the cooling surfaces (see Fig. 6).

According to another feature of my invention, I divide, for instance by means of a partition 10, the space between at least one of the sides of rotor 5 and one of the side plates of frame 1 into two chambers one of which contains the outer ends and other the inner ends of electro-magnets 6 and I provide means for producing an air stream which flows successively along the outer ends of the electro-magnets and the bearing 3 adjacent to the chamber that contains said outer ends of the electro-magnets. For this purpose, I provide in the side plates 1 of the brake down shown by Fig. 9 and between ball bearings 3 and the ends of the electro-magnets fixed in said side plates 1, apertures 24, and air is drawn out through these apertures by means of a fan 25 provided on the outside with respect to side plate 1, this air flowing along a path indicated by arrows $f^1$, i. e. first along the outer ends of electro-magnets 6, toward shaft 4, and then along ball bearings 3, to be finally discharged radially to the outside.

Fan 25 may be constituted by a blade wheel secured on shaft 4, which wheel also serves quickly to evacuate into the surrounding air the calories transmitted to this wheel by conductivity from rotor 5 and through shaft 4, this quick dissipation of these calories being due to the important calorific mass of said wheel and to its large surfaces of radiation and contact with the surrounding atmosphere. Preferably wheel 25 is made of a metal which is a good conductor of heat.

Preferably, the air stream that flows radially through the chamber that contains the external ends of electro-magnets 6 is divided into two partial streams one of which flows along ball bearing 3, to be discharged to the outside through fan 25 whereas the other one is drawn by rotor 5, this second partial air stream moving along the path shown by arrows $f^2$ (see Fig. 9), that is to say outwardly through the compartment containing the inner ends of electro-magnets 6, after it has flown along the portion of shaft 4 between bearing 3 and rotor 5.

I obtain suction of this second partial air stream under the fan effect of rotor 5 which, preferably, is fitted for this purpose, at its periphery, with blades 26. I may further intensify this second partial air stream by means of blades 27 fixed on shaft 4 close to rotor 5.

Finally, I may fix, on blades 26 and on either side of rotor 5, rims 28 which serve to increase the area of thermal radiation and contact with the surrounding atmosphere of the periphery of rotor 5. Preferably, these blades are shaped as illustrated by Fig. 9, so as to form in the blades housings for rims 28.

In order that the fan effect of the rotor be not impeded, blades 26 are made to project radially from the periphery of rotor 5 to such a distance that intervals 29 are left between rims 28 and the periphery of rotor 5 for evacuation along arrow $f^3$ (see Fig. 9) of at least a portion of the air of the second partial air stream.

Blades 26 may be fixed in the periphery of rotor 5 in any suitable manner, preferably by means of grooves 30 having a widened bottom (see Fig. 10) in which are introduced blades 26, which have a section corresponding to that of the grooves.

According to still another feature of my invention, I constitute the brake frame by two side plates 21 and 22, which carry the bearings of shaft 4 and electro-magnets 6 and which are connected together by only some stay rods 23. The ends of these rods are fixed in side plates 21 and 22 and practically the whole periphery of the brake is thus clear of any partition, whereby the rim of the rotor is directly in contact with the surrounding air (see Figs. 7 and 8).

In this last embodiment, I have therefore dispensed with the cylindrical wall 2 provided in the brake shown by Fig. 1. The cooling effect of the surrounding air is thus increased.

Furthermore, side plates 21 are preferably given the shape shown by Fig. 8, which permits of reducing the external diameter of the brake, over a great portion of the periphery thereof, to the dimensions of that of the rotor, which facilitates the mounting of the brake on automobile or automotive vehicles, where space is limited.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An electric brake which comprises, in combination, a frame, a shaft journalled in said frame connected with the part to be braked, a metal rotor carried by said shaft, electro-magnets carried by said frame to produce a magnetic field capable of braking said rotor under the effect of the Foucault currents resulting from rotation thereof, said electro-magnets, including the coils thereof, being disposed on either side of said rotor, and a metallic annular rim carried by the periphery of said rotor having a large cooling area to ensure evacuation of the heat developed in said rotor, the axial length of said annular rim being substantially greater than that of said rotor and equal to several times the radial thickness of said rim, and said annular rim surrounding at least a portion of said electro-magnets with their coils.

2. An electric brake which comprises, in combination, a frame including two side plates and a cylindrical wall extending between the peripheries of said respective side plates, a shaft connected with the part to be braked, this shaft being coaxial with said cylindrical wall and journalled in said side plates, a metal rotor carried by said shaft between said side plates, electromagnets carried by said side plates having their axes parallel to said shaft, and a metallic annular rim carried by the periphery of said rotor inside said cylindrical wall and extending on either side of said rotor to a short distance from said side plates.

3. An electric brake according to claim 1 in which said metallic annular rim is rigidly fixed to the periphery of said rotor.

4. An electric brake according to claim 1 in which said rotor is made of two adjoining discs fixed to each other and said annular rim is made of two parts each integral with one of said discs, respectively, at the periphery thereof.

5. An electric brake which comprises, in combination, a frame including two side plates and interconnecting means extending between the respective peripheries of said side plates, a shaft connected with the part to be braked journalled in said side plates, a metallic rotor carried by said shaft between said side plates, electro-magnets having their axes parallel to said shaft carried by said side plates, a metallic annular rim carried by the periphery of said rotor and projecting on either side of said rotor, partition means inside said frame for dividing at least the space between said rotor and one of said side plates into two chambers one of which contains the outer ends of the electro-magnets carried by said last mentioned side plate and the other of which carries the inner ends of the same electro-magnets, said two chambers communicating together in the vicinity of said shaft, and means for circulating air streams through said chambers along U-shaped paths, i. e. from the periphery of said frame toward said shaft through one of said chambers and from the vicinity of said shaft toward the periphery of said frame through the other chamber.

6. An electric brake which comprises, in combination, a frame including two side plates and a cylindrical wall extending between the respective peripheries of said side plates, a shaft connected with the part to be braked, said shaft being coaxial with said cylindrical wall and journalled in said side plates, a metallic rotor carried by said shaft between said side plates, electromgnets having their axes parallel to said shaft by said side plates, a metallic annular rim carried by the periphery of said rotor inside said cylindrical wall and projecting on either side of said rotor, partition means inside said frame for dividing at least the space between said rotor and one of said side plates into two chambers one of which contains the outer ends of the electro-magnets carried by said last mentioned side plate and the other of which carries the inner ends of the same electro-magnets, said two chambers communicating together in the vicinity of said shaft, and means for circulating air streams through said chambers along U-shaped paths, i. e. from the periphery of said frame toward said shaft through one of said chambers and from the vicinity of said shaft toward the periphery of said frame through the other chamber.

7. An electric brake according to claim 5 in which said last mentioned means consist of blades carried by said rim.

8. An electric brake according to claim 5 in which said annular rim is made of three parts, to wit, a central one directly carried by said rotor and two end parts carried by said central part and extending to a greater distance in the axial direction than said central part, the last mentioned means of said claim 6 consisting of blades for causing the inflow and outflow of said air streams respectively integral with said end parts and said central part of said rim.

9. An electric brake according to claim 6 in which said last mentioned means consist of blades carried by said rim, said cylindrical wall being provided with apertures opposite said blades, for the inflow and outflow of the air streams.

10. An electric brake according to claim 6 in which said annular rim is made of three parts, to wit, a central one directly carried by said rotor and two end parts carried by said central part and extending to a greater distance in the axial direction than said central part, the last mentioned means of said claim 7 consisting of blades for causing the inflow and outflow of said air streams respectively integral with said end parts and said central part of said rim, said cylindrical wall being provided with apertures opposite said blades for the inflow and outflow of said air streams.

11. An electric brake which comprises, in combination, a frame including two side plates and a cylindrical wall extending between the respective peripheries of said side plates, a shaft coaxial with said cylindrical wall, said shaft being connected with the part to be braked, bearings for said shaft carried by said side plates, a metallic rotor carried by said shaft between said side plates, electromagnets having their axes parallel to said shaft carried by said side plates, a metallic annular rim carried by the periphery of said rotor inside said cylindrical wall and projecting on either side of said rotor, partition means inside said frame for dividing at least the space between said rotor and one of said side plates into two chambers one of which contains the outer ends of the electro-magnets carried by said last mentioned side plate and the other of which contains the inner ends of the said electro-magnets, said two chambers communicating together in the vicinity of said shaft, said last mentioned side plate being provided with apertures about the shaft bearing it carries, and means for circulating air streams radially through the first mentioned chamber from the periphery of said frame toward said shaft, and outwardly through said apertures.

12. An electric brake according to claim 11 in which said last mentioned means include a wheel coaxial with said shaft and driven together therewith, located on the outer side of said last mentioned side plate, and impeller blades carried by said wheel.

13. An electric brake according to claim 11 further including means for circulating a portion of the inwardly flowing air streams from the first mentioned chamber through the second mentioned chamber from the vicinity of said shaft toward the periphery of said frame.

14. An electric brake which comprises, in combination, a frame including two side plates and a cylindrical wall extending between the respective peripheries of said side plates, a shaft coaxial with said cylindrical wall, said shaft being connected with the part to be braked, bearings for said shaft carried by said side plates, a metallic rotor carried by said shaft between said side plates, electro-magnets having their axes parallel to said shaft carried by said side plates, a metallic annular rim carried by the periphery of said rotor inside said cylindrical wall and projecting on either side of said rotor, partition means inside said frame for dividing at least the space between said rotor and one of said side plates into two chambers one of which contains the outer ends of the electro-magnets carried by said last mentioned side plate and the other of which contains the inner ends of the said electro-magnets, said two chambers communicating together in the vicinity of said shaft, said last mentioned side plate being provided with apertures about the shaft bearing it carries, a wheel coaxial with said shaft and driven together therewith, located on the outer side of said last mentioned side plate, impeller blades carried by said wheel for circulating air streams radially through the first mentioned chamber from the periphery of said frame toward said shaft, and outwardly throuh said apertures, and blades carried by said rim for causing a portion of the air streams passing through the first mentioned chamber to flow through the second mentioned chamber from the vicinity of said shaft toward the periphery of said frame.

PIERRE ETIENNE BESSIÈRE.

REFERENCES CITED

The following references are of record in the file of this patent:

UNITED STATES PATENTS

| Number | Name | Date |
|---|---|---|
| 912,504 | Steckel | Feb. 16, 1909 |
| 1,592,804 | Young | July 13, 1926 |
| 2,012,748 | Baughman | Aug. 27, 1935 |
| 2,068,820 | Sarazin | Jan. 26, 1937 |
| 2,167,487 | Moss | July 25, 1939 |
| 2,298,725 | Rogowski | Oct. 13, 1942 |

FOREIGN PATENTS

| Number | Country | Date |
|---|---|---|
| 509,359 | Great Britain | July 14, 1939 |